United States Patent [19]
Aslam et al.

[11] Patent Number: 4,929,694
[45] Date of Patent: May 29, 1990

[54] COPOLYMERS OF P-MERCAPTOSTYRENE AND ITS ESTERS

[75] Inventors: Mohammad Aslam, Corpus Christi, Tex.; Richard Vicari, Chatham Township; Kenneth G. Davenport, Basking Ridge, both of N.J.

[73] Assignee: Hoechst Celanese Corporation, North Somerville, N.J.

[21] Appl. No.: 348,337

[22] Filed: May 4, 1989

[51] Int. Cl.$^5$ ............................................. C08F 228/02
[52] U.S. Cl. ................................... 526/262; 526/271; 526/286
[58] Field of Search ........................ 526/262, 271, 286

[56] References Cited

U.S. PATENT DOCUMENTS 4,794,205 12/1988 Aslam ................................... 558/557

Primary Examiner—Christopher Henderson
Attorney, Agent, or Firm—Donald R. Cassady; Marvin Turken

[57] ABSTRACT

There are provided novel copolymers of a p-mercaptostyrene ester, e.g., the acetate, with at least one comonomer selected from the group consisting of styrene, N-methylmaleimide, maleic anhydride and p-acetoxystyrene. These copolymers may be hydrolyzed to produce corresponding copolymers of p-mercaptostyrene with at least one comonomer selected from the group consisting of styrene, N-methylmaleimide, maleic acid and p-vinylphenol. The copolymers have application as heavy metal sequestering agents in various forms and structures.

6 Claims, No Drawings

COPOLYMERS OF P-MERCAPTOSTYRENE AND ITS ESTERS

BACKGROUND OF THE INVENTION

1. Field of the Invention

This invention relates to novel copolymers of p-mercaptostyrene and its esters.

2. Description of Related Art

The following information is disclosed in accordance with the terms of 37 CFR 1.56, 1.97 and 1.98.

Overberger, C.G. et al., *J. Amer. Chem. Soc.* (1956) 78, 4792–4797, disclose copolymers of p-vinylphenyl thioacetate, i.e., p-mercaptostyrene acetate, with methyl methacrylate, and the hydrolysis of two of the copolymers. The reference also discloses the preparation of the homopolymer poly-p-vinylphenyl thioacetate and the hydrolysis of this homopolymer to poly-p-thiolstyrene, i.e., poly(p-mercaptostyrene).

U.S. Pat. No. 2,947,731, issued Aug. 2, 1960 to Nummy, discloses copolymers of vinylbenzyl thiolesters of carboxylic acids with other unsaturated vinyl or vinylidene compounds such as styrene, methyl methacrylate and methyl isopropenyl ketone.

U.S. Pat. No. 4,794,205, issued Dec. 27, 1988 to Aslam et al., discloses that sulfhydryl-containing monomers such as para-vinylthiophenol, i.e., p-mercaptostyrene, and their esters, e.g., para-vinylthiophenol acetate, are suitable for the production of resins useful for the extraction of metals such as mercury and lead, citing P.A. Schweitzer, *Handbook of Separation Techniques for Chemical Engineers* (McGraw-Hill), page 1–386 (one page).

SUMMARY OF THE INVENTION

In accordance with this invention, there are provided novel copolymers of p-mercaptostyrene (PMS) esters, e.g., the acetate, with at least one comonomer selected from the group consisting of styrene, N-methylmaleimide, maleic anhydride and p-acetoxystyrene and novel copolymers of p-mercaptostyrene (PMS) with styrene, N-methylmaleimide, maleic acid or p-vinylphenol resulting from hydrolysis of the foregoing copolymers of p-mercaptostyrene esters. The hydrolyzed copolymers have application as heavy metal sequestering agents in various forms and structures, e.g., films, microporous molded articles and beads. More specifically, they have specialty applications in water treatment or purification, mining and recovery, generally from process solutions and waste streams of heavy metals such as gold, silver, copper, nickel, mercury and lead.

DESCRIPTION OF PREFERRED EMBODIMENTS

The invention contemplates addition copolymers having an all carbon backbone and p-mercaptophenyl side chains. In order to prevent a chemical shift of sulfur to the polymer backbone during polymerization, the mercapto moiety is advantageously masked as a thioester. Preferred for this purpose are esters of the PMS and a carboxylic acid containing from 2 to about 4 carbon atoms, e.g., PMS acetate, propionate or isobutyrate, and especially preferred is the acetate (PMSA). Subsequent to the polymerization, a copolymer containing free p-mercaptophenyl side groups may be obtained by subjecting the PMS ester copolymer to a hydrolysis treatment as described hereinafter.

In addition to the PMS ester and one of the designated comonomers, one or more additional monomers may be present in the polymerizable mixture used to prepared the polymers of this invention. Such additional monomers may be, for example, another monoethylenically unsaturated compound such as alkyl acrylates and methacrylates wherein the alkyl group contains from 1 to 12 carbon atoms, mono- and polyalkoxyalkylacrylates and methacrylates wherein the alkoxy groups and alkyl groups contain from 1 to 4 carbon atoms and wherein the molecules contain from 1 to 20 alkoxy groups, hydroxyalkyl acrylates and methacrylates wherein the alkyl group contains from 1 to 6 carbon atoms, acrylic acid, methacrylic acid, maleic anhydride, acrylonitrile, methacrylonitrile, vinyl halides such as vinyl chloride, vinyl pyrrolidone, vinyl pyridide, vinyl carbazole and the like.

Other additional comonomers which can be employed and which are particularly useful if the copolymer is to be utilized as a cross-linked solvent resistant ion-exchange resin are polyunsaturated comonomers capable of providing for the subsequent cross-linking of the copolymers. Contemplated polyunsaturated addition comonomers are, for example, conjugated diene hydrocarbons and halogenated hydrocarbons such as butadiene, isoprene and chloroprene; non-conjugated polyunsaturated hydrocarbons such as divinylbenzenes and divinyltoluenes; dialkyl esters of dicarboxylic acids such as diallyl maleate, diallyl fumarate, diallyl itaconate and diallyl terephthalate; allyl esters of monounsaturated, monocarboxylic acids such as allyl acrylate and allyl methacrylate; and alkyl esters of polyunsaturated carboxylic acids such as alkyl sorbates and dialkyl muconates. Any alkyl groups in the foregoing comonomers preferably contain 1 to about 4 carbon atoms.

The copolymers of this invention may be suitably prepared by the free radical polymerization of the PMS ester and at least one of the designated comonomers either in solution, emulsion or suspension, using well known polymerization techniques. A free radical type of polymerization initiator or "catalyst" is generally employed which is preferably an azo compound such as 2,2'-azobis(isobutyronitrile) (AIBN), 2,2-azobis(2,4-dimethylvaleronitrile) (sold by du Pont as "VAZO-52"), 2,2'-azobis(methylbutyronitrile), (sold by du Pont as "VAZO-67") and 1,1'-azobis(cyanocyclohexane) (sold by du Pont as "VAZO-88"). Other free-radical polymerization initiators which may be used are peroxy compounds, e.g., benzoyl peroxide and potassium persulfate, and peresters and peroxyketals sold by Pennwalt under the trademark "Lupersols".

The copolymers of the invention will generally contain about 10 to about 90 weight percent, preferably about 20 to 80 weight percent of the PMS ester and about 10 to 90 weight percent, preferably about 20 to 80 weight percent of the designated comonomer. If one or more monounsaturated or polyunsaturated monomers are used in addition to the PMS ester and designated comonomer critical to the invention, they may be present in an amount of about 0 to 50, preferably about 0 to 20 percent by weight of the total monomeric mixture.

Once the copolymer is formed, the ester groups of the PMS ester moieties may be hydrolyzed to yield free mercapto groups. This may be accomplished, for example, by adding a sufficient amount of a base, e.g., an alkali metal hydroxide such as sodium hydroxide or potassium hydroxide, to a suspension of the ester containing copolymer in a solvent or suspending agent for the copolymer salt, e.g., water, a mixture of ethylene glycol and water or tetrahydrofuran, and heating the resulting alkaline mixture at a sufficient temperature and time to cause hydrolysis of the ester groups. The copolymer containing free mercapto groups is then recovered by acidifying the mixture, e.g., with a solution of acetic acid in methanol, filtering the solid polymer, washing with water and drying in a vacuum oven.

The following examples further illustrate the invention.

EXAMPLES 1 to 3

These examples illustrate the preparation of copolymers of p-mercaptostyrene acetate (PMSA) and styrene or N-methylmaleimide in accordance with this invention.

Varying amounts of PMSA and styrene or N-methylmaleimide were dissolved in 50 mL of dry tetrahydrofuran (THF). The polymerization initiator AIBN in an amount of 0.2 wt.% based on the weight of the monomers was added and the mixture was heated at reflux under a nitrogen atmosphere for 24 hours. The reaction mixture was then cooled and added dropwise to methanol (500 mL) with stirring to obtain a precipitated white polymer. The polymer was filtered and dried in a vacuum oven at 50° C. for 24 hours. The specific conditions of the reactions and the yields of polymer obtained are shown in the following table.

TABLE

| Example | PMSA moles | Comonomer compound | moles | Polymerization Temp, °C. | Yield % |
|---|---|---|---|---|---|
| 1 | 0.030 | styrene | 0.030 | 70 | 39.3 |
| 2 | 0.025 | styrene | 0.025 | 68 | 48.0 |
| 3 | 0.026 | N-methyl-maleimide | 0.026 | 68 | 79.0 |

The copolymers of the foregoing table were each determined by NMR analysis to have a molar ratio of polymerized PMSA to comonomer of about 1:1.

EXAMPLE 4

The procedure of Example 1 is followed except that maleic anhydride (0.030 mol) is substituted for styrene as comonomer. A copolymer of PMSA and maleic anhydride is obtained.

EXAMPLE 5

The procedure of Example 1 is followed except that p-acetoxystyrene (0.030 mol) is substituted for styrene. A copolymer of PMSA and p-acetoxystyrene is obtained.

Examples 6 to 9 illustrate the hydrolysis of the acetate groups of the PMSA copolymers of this invention to obtain the corresponding copolymers containing free mercapto groups.

EXAMPLE 6

The copolymer of PMSA with styrene produced in Example 1 (8.46 g) is suspended in ethylene glycol and water (50:25). Potassium hydroxide (3.36 g, 0.06 mol) is added and the reaction is heated at 75–80° C. for 24 h. The reaction mixture is cooled, filtered and the filtrate is acidified with a solution of acetic acid (25 mL) in methanol (100 mL). The precipitated copolymer of PMS with styrene containing free mercapto groups is collected via filtration, washed with water, and dried in a vacuum oven.

This hydrolyzed copolymer has particularly good hydrolytic stability as compared, for example, with copolymers of p-mercaptostyrene and methyl methacrylate, and thus has special utility in the presence of water, e.g., as ion exchange resins for the treatment of aqueous solutions.

EXAMPLE 7

The procedure of Example 6 is followed starting with the copolymer of PMSA and N-methylmaleimide (8.67 g) produced in Example 3, to obtain a copolymer of PMS with N-methylmaleimide containing free mercapto groups.

This hydrolyzed copolymer has particularly good hydrolytic and thermal stability and is thus especially useful for the separation of metals from aqueous solution at elevated temperatures, e.g., as occurs in mining or drilling wells.

EXAMPLE 8

The procedure of Example 6 is followed starting with the copolymer of PMSA and maleic anhydride (8.19 g) produced in Example 4, to obtain a copolymer of PMS with maleic acid containing free mercapto and carboxyl groups.

The presence of carboxyl groups in the maleic acid moieties of this hydrolyzed copolymer causes the copolymer to have increased solubility in water. Thus, the copolymer has particular applicability where some degree of water solubility is necessary, e.g., as a complexing agent for metals in aqueous solution.

EXAMPLE 9

The procedure of Example 6 is followed starting with the copolymer of PMSA and p-acetoxystyrene (10.20 g) produced in Example 5, to obtain a copolymer of PMS with p-vinylphenol containing free mercapto and hydroxyl groups.

The hydroxyl groups in the vinylphenol moieties of this hydrolyzed copolymer make it particularly useful in applications where such hydroxyl groups are active, e.g., in the complexing of metals in various separation processes.

We claim:

1. Copolymers of a p-mercaptostyrene ester where in ester group is derived from a carboxylic acid containing 2 to 4 carbon atoms, with at least one comonomer selected from the group consisting of styrene, N-methylmaleimide, maleic anhydride and p-acetoxystyrene.

2. The copolymers of claim 1 wherein said comonomer is p-acetoxystyrene.

3. The copolymers of claim 1 wherein said ester is p-mercaptostyrene acetate.

4. The copolymers of claim 1 wherein said comonomer is styrene.

5. The copolymers of claim 1 wherein said comonomer is N-methylmaleimide.

6. The copolymers of claim 1 wherein said comonomer is maleic anhydride.

* * * * *